(12) United States Patent
Gallucci et al.

(10) Patent No.: US 7,300,742 B2
(45) Date of Patent: *Nov. 27, 2007

(54) DATA STORAGE MEDIUM AND METHOD FOR THE PREPARATION THEREOF

(75) Inventors: Robert R. Gallucci, Mt. Vernon, IN (US); Charles D. Iacovangelo, Clifton Park, NY (US); Donald G. LeGrand, Burnt Hills, NY (US); James R. Wilson, Troy, MI (US)

(73) Assignee: General Electric Company, Schenectady, NY (US)

( * ) Notice: Subject to any disclaimer, the term of this patent is extended or adjusted under 35 U.S.C. 154(b) by 359 days.

This patent is subject to a terminal disclaimer.

(21) Appl. No.: 10/638,145

(22) Filed: Aug. 7, 2003

(65) Prior Publication Data

US 2004/0063031 A1    Apr. 1, 2004

Related U.S. Application Data

(60) Provisional application No. 60/405,609, filed on Aug. 23, 2002.

(51) Int. Cl.
*G11B 7/24* (2006.01)

(52) U.S. Cl. ............... 430/270.12; 430/945; 428/64.4; 428/64.7

(58) Field of Classification Search ............ None
See application file for complete search history.

(56) References Cited

U.S. PATENT DOCUMENTS

| | | |
|---|---|---|
| 2,999,835 A | 9/1961 | Goldberg |
| 3,153,008 A | 10/1964 | Fox |
| 3,169,121 A | 2/1965 | Goldberg |
| 3,306,874 A | 2/1967 | Hay |
| 3,306,875 A | 2/1967 | Hay |
| 3,334,154 A | 8/1967 | Kim |
| 3,642,946 A | 2/1972 | Grabowski et al. |
| 3,847,867 A | 11/1974 | Heath et al. |
| 3,850,885 A | 11/1974 | Takekoshi et al. |

(Continued)

FOREIGN PATENT DOCUMENTS

CA    2099852    *    7/1993

(Continued)

OTHER PUBLICATIONS

Kirk-Othmer, Encyclopedia of Chemical Technology, Second Edition, vol. 16, pp. 272-281 (1968).

(Continued)

*Primary Examiner*—Martin Angebranndt
(74) *Attorney, Agent, or Firm*—Cantor Colburn LLP

(57) ABSTRACT

A data storage medium includes a substrate, a reflective metal layer, and a haze-prevention layer between the substrate and the reflective metal layer. The substrate includes an amorphous thermoplastic resin having a heat distortion temperature of at least about 140° C., a density less than 1.7 grams per milliliter, and an organic volatiles content less than 1,000 parts per million measured according to ASTM D4526. The haze-prevention layer includes a material having a volume resistivity of at least $1 \times 10^{-4}$ ohm-centimeters and a tensile modulus of at least about $3 \times 10^{5}$ pounds per square inch. The data storage medium resists hazing of the reflective layer at elevated temperatures.

14 Claims, 1 Drawing Sheet

U.S. PATENT DOCUMENTS

| | | | |
|---|---|---|---|
| 3,852,242 A | | 12/1974 | White |
| 3,855,178 A | | 12/1974 | White |
| 3,983,093 A | | 9/1976 | Williams et al. |
| 3,986,997 A | | 10/1976 | Clark |
| 4,001,184 A | | 1/1977 | Scott |
| 4,011,200 A | | 3/1977 | Yonemitsu et al. |
| 4,038,343 A | | 7/1977 | Yonemitsu et al. |
| 4,123,436 A | | 10/1978 | Holub et al. |
| 4,131,575 A | | 12/1978 | Adelmann et al. |
| 4,156,069 A | | 5/1979 | Prevorsek et al. |
| 4,195,312 A | * | 3/1980 | Bell et al. ............ 369/284 |
| 4,210,841 A | | 7/1980 | Vodicka et al. |
| 4,348,462 A | | 9/1982 | Chung |
| 4,363,844 A | | 12/1982 | Lewis et al. |
| 4,491,508 A | | 1/1985 | Olson et al. |
| 4,578,684 A | * | 3/1986 | Gupta et al. ............ 346/135.1 |
| 4,624,870 A | | 11/1986 | Anthony |
| 4,638,335 A | | 1/1987 | Smith et al. |
| 4,663,421 A | | 5/1987 | Mark |
| 4,754,128 A | * | 6/1988 | Takeda et al. ............ 235/488 |
| 4,902,584 A | * | 2/1990 | Uchiyama et al. ........ 428/824.2 |
| 4,937,691 A | | 6/1990 | Narayan et al. |
| 4,942,073 A | * | 7/1990 | Era et al. ............ 428/64.9 |
| 5,034,458 A | | 7/1991 | Serini et al. |
| 5,045,344 A | | 9/1991 | Pinkhasov |
| 5,118,573 A | * | 6/1992 | Tawara et al. ............ 428/824.2 |
| 5,297,132 A | * | 3/1994 | Takano et al. ............ 369/284 |
| 5,330,852 A | * | 7/1994 | Gerstenberg et al. .... 428/824.5 |
| 5,346,767 A | | 9/1994 | Tilley et al. |
| 5,378,284 A | | 1/1995 | Geisler et al. |
| 5,447,767 A | | 9/1995 | Tanabe et al. |
| 5,503,934 A | | 4/1996 | Maas et al. |
| 5,506,038 A | | 4/1996 | Knapp et al. |
| 5,508,092 A | | 4/1996 | Kimock et al. |
| 5,512,416 A | * | 4/1996 | Namba et al. ......... 430/270.21 |
| 5,525,379 A | * | 6/1996 | Takada et al. ............ 427/571 |
| 5,527,596 A | | 6/1996 | Kimock et al. |
| 5,783,360 A | * | 7/1998 | Phillips et al. ......... 430/270.12 |
| 5,783,653 A | | 7/1998 | Okamoto et al. |
| 5,849,087 A | | 12/1998 | Kloberdanz et al. |
| 6,110,544 A | | 8/2000 | Yang et al. |
| 6,183,829 B1 | * | 2/2001 | Daecher et al. ............ 428/64.1 |
| 6,261,694 B1 | | 7/2001 | Iacovangelo |
| 6,347,016 B1 | | 2/2002 | Ishida et al. |
| 6,355,723 B1 | | 3/2002 | Van Baal et al. |
| 6,379,757 B1 | | 4/2002 | Iacovangelo |
| 6,397,776 B1 | | 6/2002 | Yang et al. |
| 6,420,032 B1 | | 7/2002 | Iacovangelo |
| 6,436,503 B1 | | 8/2002 | Cradic et al. |
| 6,520,650 B2 | | 2/2003 | Frazier et al. |
| 6,544,616 B2 | | 4/2003 | Nee |
| 2002/0025443 A1 | * | 2/2002 | Ohno ............ 428/469 |
| 2002/0048691 A1 | | 4/2002 | Davis et al. |
| 2002/0094455 A1 | | 7/2002 | Feist et al. |
| 2002/0197438 A1 | | 12/2002 | Hay et al. |
| 2003/0044564 A1 | | 3/2003 | Dris et al. |
| 2004/0062932 A1 | | 4/2004 | Gallucci et al. |
| 2004/0062944 A1 | | 4/2004 | Gallucci et al. |
| 2004/0067374 A1 | | 4/2004 | Borst et al. |

FOREIGN PATENT DOCUMENTS

| | | | |
|---|---|---|---|
| CA | 2099854 | | 1/1994 |
| EP | 0 745 872 A2 | | 12/1996 |
| EP | 0 747 460 A1 | | 12/1996 |
| JP | 58-196636 | * | 11/1983 |
| JP | 60-203489 | * | 10/1985 |
| JP | 61286801 | | 12/1986 |
| JP | 63-108540 | * | 5/1988 |
| JP | 63-166039 | * | 7/1988 |
| JP | 63-201929 | * | 8/1988 |
| JP | 01-232553 | * | 9/1989 |
| JP | 02-312020 | * | 12/1990 |
| JP | 03-248337 | * | 11/1991 |
| JP | 04-177632 | * | 6/1992 |
| JP | 06-044608 | * | 2/1994 |
| JP | 06-349119 | * | 12/1994 |

OTHER PUBLICATIONS

ASTM D 1003-00 Standard Test Method for Haze and Luminous Transmittance of Transparent Plastics (6 pages).

ASTM D 523-89 (Reapproved 1999) Standard Test Method for Specular Gloss (5 pages).

http://www.matweb.com/reference/deflection-temperature.asp (2 pgs).

Y. Barrell et al., "Expanding Thermal Plasma for Fast Deposition of Scratch-Resistant $SiC_xH_yO_z$ Films", Surface and Coatings Technology 180-181 (2004) 367-371.

M.F.A.M. van Hest doctoral thesis, "High Rate Deposition of Silicone Oxide Like Films" pp. 95-108, 133-154, 167-169 (2002).

JP2523303B2; Aug. 7, 1996; Machine Translation Only (19 pages).

U.S. Appl. No. 10/638,099 Non Final Office Action filed Jun. 30, 2004 (10 pages).

U.S. Appl. No. 10/638,099 Non Final Office Action filed Jan. 11, 2005 (10 pages).

U.S. Appl. No. 10/638,099 Final Office Action filed Aug. 11, 2005 (8 pages).

U.S. Appl. No. 10/638,099 Advisory Action filed Oct. 27, 2005 (3 pages).

U.S. Appl. No. 10/638,099 Non Final Office Action filed Nov. 29, 2005 (10 pages).

U.S. Appl. No. 10/638,099 Final Office Action filed Apr. 4, 2006 (12 pages).

JP6349119; Dec. 22, 1994; Human Translation (8 pages).

Human Translation of JP58196636; Publication Date Nov. 16, 1983; 4 pages.

* cited by examiner

DATA STORAGE MEDIUM AND METHOD FOR THE PREPARATION THEREOF

CROSS REFERENCE TO RELATED APPLICATIONS

This application claims priority to U.S. Provisional Application Ser. No. 60/405,609, filed Aug. 23, 2002.

BACKGROUND

Reflective articles comprising a thermoplastic substrate and a reflective metal layer are currently employed in a variety of product applications, including automotive headlight reflectors and data storage media (e.g., data storage discs). Such articles may perform well at ambient temperatures, but at the elevated temperatures encountered in certain manufacturing and use conditions, their reflectivity may be impaired by the formation of haze in the reflective coating.

There is therefore a need for reflective articles that maintain their reflectivity at elevated temperatures.

BRIEF SUMMARY

One embodiment is a data storage medium improved heat-resistance, comprising: a substrate comprising an amorphous thermoplastic resin having a heat distortion temperature of at least about 140° C. measured at 66 pounds per square inch (psi) according to ASTM D648, a density less than 1.7 grams per milliliter, and an organic volatiles content less than 1,000 parts per million measured according to ASTM D4526; a reflective metal layer; and a haze-prevention layer interposed between the substrate and the reflective metal layer, wherein the haze-prevention layer comprises a material having a volume resistivity of at least $1 \times 10^{-4}$ ohm-centimeters measured according to ASTM D257 at 25° C. and a tensile modulus of at least about $3 \times 10^5$ pounds per square inch measured according to ASTM D638 at 25° C.

Other embodiments, including a method of preparing the data storage medium, are described in detail below.

DETAILED DESCRIPTION OF THE PREFERRED EMBODIMENTS

Figure 1:
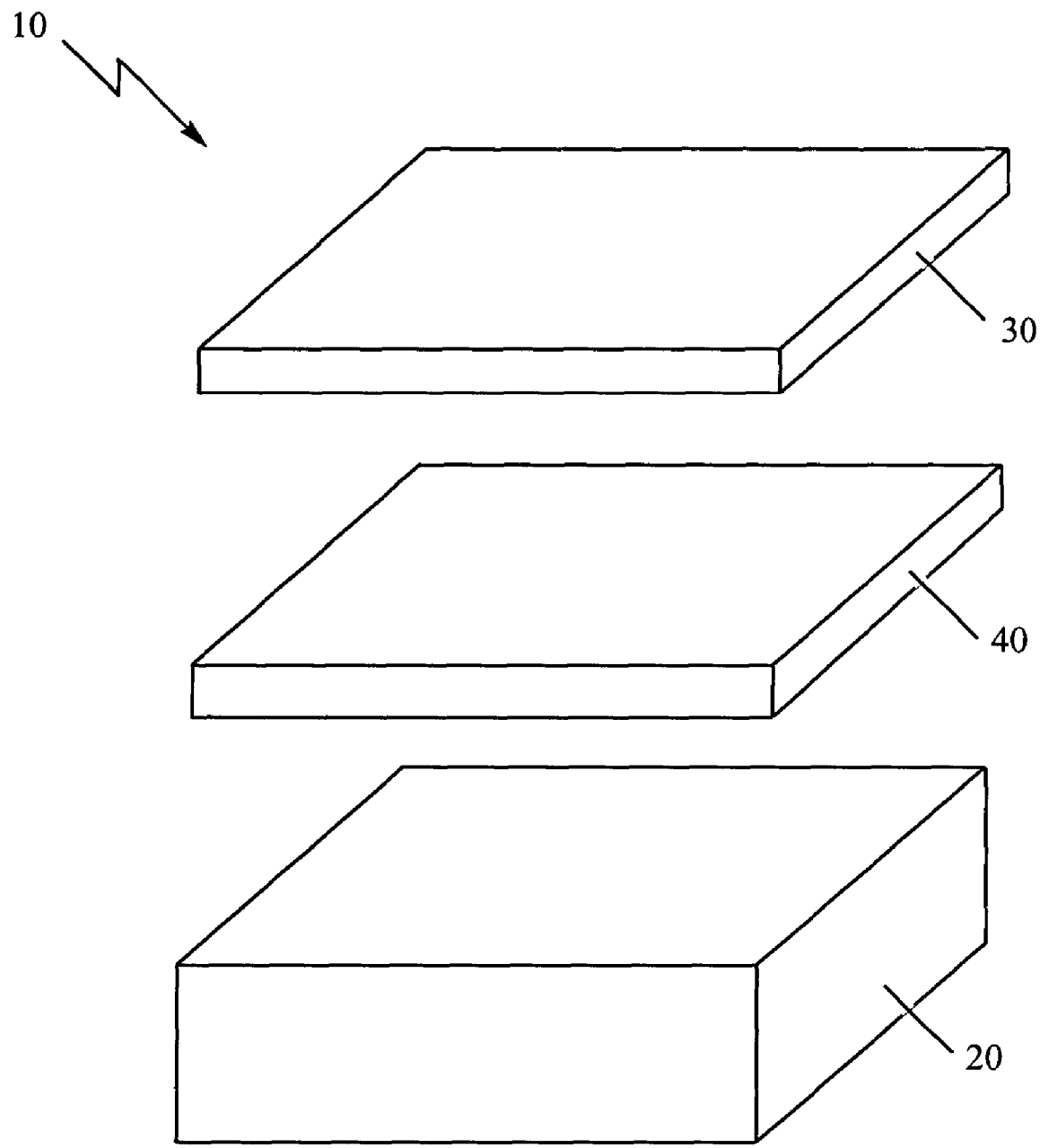
FIG. 1 is an exploded view of a reflective article 10 comprising a thermoplastic substrate 20, a reflective metal layer 30, and a haze-prevention layer 40.

One embodiment is a data storage medium, comprising: a substrate comprising an amorphous thermoplastic resin having a heat distortion temperature of at least about 140° C. measured at 66 psi according to ASTM D648, a density less than 1.7 grams per milliliter, and an organic volatiles content less than 1,000 parts per million measured according to ASTM D4526; a reflective metal layer; and a haze-prevention layer interposed between the substrate and the reflective metal layer, wherein the haze-prevention layer comprises a material having a volume resistivity of at least $1 \times 10^{-4}$ ohm-centimeters measured according to ASTM D257 at 25° C. and a tensile modulus of at least about $3 \times 10^5$ pounds per square inch measured according to ASTM D638 at 25° C.

During the commercial development of reflectors for automotive headlights, it was sometimes observed that reflectors prepared by direct metalization of a thermoplastic substrate would initially exhibit excellent reflectivity, but under conditions of use, hazing of the reflective surface would occur, leading to failure of the part. Through extensive research on a variety of materials, the present inventors have discovered that haze-formation under high-temperature conditions can be reduced or eliminated by interposing between the thermoplastic substrate and the reflective metal layer a haze-prevention layer comprising a material having a volume resistivity of at least $1 \times 10^{-4}$ ohm-centimeters measured according to ASTM D257 at 25° C. and a tensile modulus of at least about $3 \times 10^5$ pounds per square inch measured according to ASTM D638 at 25° C.

The substrate comprises an amorphous thermoplastic resin having a heat distortion temperature of at least about 140° C., preferably at least about 170° C., more preferably at least about 185° C., still more preferably at least about 200° C., measured at 66 psi according to ASTM D648. The amorphous thermoplastic also has a density less than 1.7 grams/milliliter (g/mL), preferably less than 1.6 g/mL, more preferably less than 1.5 g/mL. The density of the amorphous thermoplastic resin may be determined at 25° C. according to ASTM D792. The amorphous thermoplastic resin is thus less dense than bulk molding compounds that have often been used to form reflective articles. When the reflective article is a headlight reflector, the use of the amorphous resin reduces the weight of the headlight thereby contributes to weight reductions that allow more vehicle miles per gallon of fuel. The amorphous thermoplastic further has an organic volatiles content less than 1,000 parts per million by weight, preferably less than 750 parts per million by weight, more preferably less than 500 parts per million by weight, measured according to ASTM D4526. As specified in ASTM D4526, the volatiles are determined by sampling a headspace in equilibrium with the thermoplastic at 90° C., and they are quantified using flame ionization detection. The organic volatiles content is thus lower than that of bulk molding compounds, which may contain high concentrations of residual monomers that outgas at elevated temperatures and decrease the reflectivity of the reflective metal layer. Suitable thermoplastic resins include, for example, polyetherimides, polyetherimide sulfones, polysulfones, polyethersulfones, polyphenylene ether sulfones, poly(arylene ether)s, polycarbonates, polyester carbonates, polyarylates, and the like, and mixtures thereof. These thermoplastics and methods for their preparation are known in the art.

Preferred polyetherimides include those comprising structural units of the formula (I)

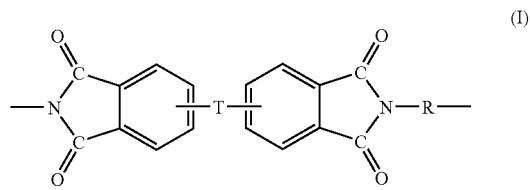

wherein the divalent T moiety bridges the 3,3', 3,4', 4,3', or 4,4' positions of the aryl rings of the respective aryl imide moieties of formula (I); T is —O— or a group of the formula —O—Z—O—; Z is a divalent radical selected from the group consisting of formulae (II)

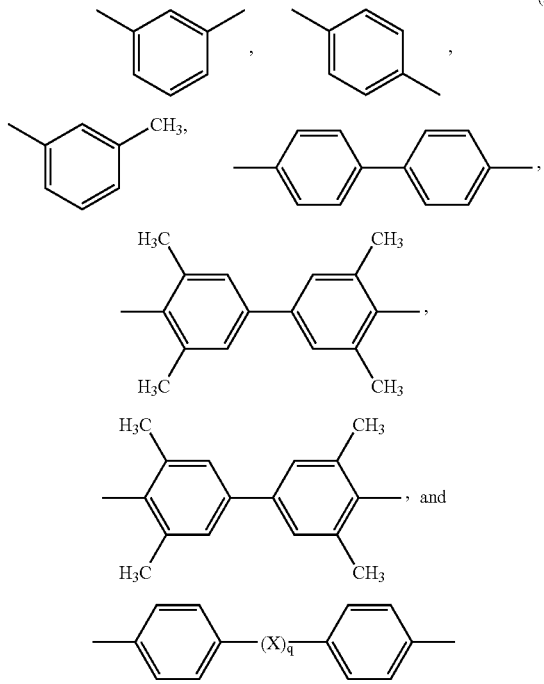

wherein X is a member selected from the group consisting of divalent radicals of the formulae (III)

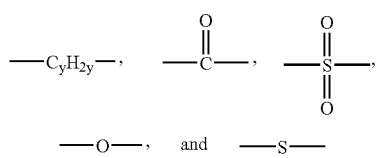

wherein y is an integer of 1 to about 5, and q is 0 or 1; R is a divalent organic radical selected from (a) aromatic hydrocarbon radicals having 6 to about 20 carbon atoms and halogenated derivatives thereof, (b) alkylene radicals having 2 to about 20 carbon atoms, (c) cycloalkylene radicals having 3 to about 20 carbon atoms, and (d) divalent radicals of the general formula (IV)

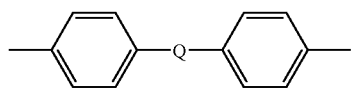

where Q is a covalent bond or a member selected from the group consisting of formulae (V)

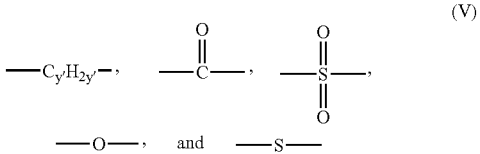

where y' is an integer from 1 to about 5.

In the formulas above, when X or Q comprises a divalent sulfone linkage, the polyetherimide may be considered a polyetherimide sulfone.

Generally, useful polyetherimides have a melt index of about 0.1 to about 10 grams per minute (g/min), as measured by American Society for Testing Materials (ASTM) D1238 at 337° C., using a 6.6 kilogram weight.

In a preferred embodiment, the polyetherimide resin has a weight average molecular weight of about 10,000 to about 150,000 atomic mass units (AMU), as measured by gel permeation chromatography using polystyrene standards. Such polyetherimide resins typically have an intrinsic viscosity greater than about 0.2 deciliters per gram measured in m-cresol at 25° C. An intrinsic viscosity of at least about 0.35 deciliters per gram may be preferred. Also, an intrinsic viscosity of up to about 0.7 deciliters per gram may be preferred.

Included among the many methods of making the polyetherimide resin are those described, for example, in U.S. Pat. No. 3,847,867 to Heath et al., U.S. Pat. No. 3,850,885 to Takekoshi et al., U.S. Pat. Nos. 3,852,242 and 3,855,178 to White, and U.S. Pat. No. 3,983,093 to Williams et al.

In a preferred embodiment, the polyetherimide resin comprises structural units according to formula (I) wherein each R is independently paraphenylene or metaphenylene and T is a divalent radical of the formula (VI).

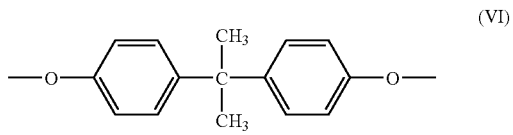

A particularly preferred polyetherimide resin is the reaction product formed by melt polymerization of 2,2-bis[4-(3,4-dicarboxyphenoxy)phenyl]propane dianhydride with one or more of paraphenylene diamine and metaphenylene diamine. The polyetherimides are commercially available from General Electric Company as ULTEM® resins, including, for example, ULTEM® 1000, ULTEM® 1010, ULTEM® 6000, ULTEM® XH6050, and ULTEM® CRS5000. Additional description of polyetherimide polymers may be found, for example, in ASTM 5205, Standard Classification System for Polyetherimide (PEI) Materials.

Polysulfones suitable for use in the thermoplastic substrate are polymeric comprising repeating units having at least one sulfone group. Polysulfones and methods for their preparation are well known in the art and described, for example, in U.S. Pat. No. 3,642,946 to Grabowski et al.; and Kirk-Othmer, Encyclopedia of Chemical Technology, Second Edition, Vol. 16, pp. 272-281 (1968). Representative polymers of this type include polysulfones, polyether sulfones, and polyphenyl sulfones.

The polysulfones that may be utilized in the instant invention contain at least one recurring structural unit represented by the general formula (VII)

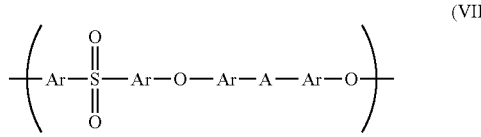

(VII)

wherein each occurrence of Ar is independently unsubstituted phenylene or phenylene substituted with phenyl, $C_1$-$C_{12}$ alkyl, $C_1$-$C_{12}$ alkoxy, halogen, nitro, or the like; and each occurrence of A is independently a direct carbon-to-carbon bond, $C_1$-$C_{12}$ alkylidene, $C_3$-$C_8$ cycloalkylidene, carbonyl sulfoxide, sulfur, sulfone, azo, imino, oxygen, or the like.

The polysulfones of Formula (VII) are preferably derived from dichlorodiphenyl sulfones reacted with bisphenols. A second group of sulfones represented by Formula I is one in which each Ar is phenylene and A is sulfone. A third major group of polysulfones represented by Formula I are those wherein each Ar is phenylene and A is oxygen, i.e., the polyarylethersulfones. When Ar is phenylene, it should preferably be either meta or para and may be substituted in the ring positions with $C_1$-$C_6$ alkyl groups, $C_1$-$C_6$ alkoxy groups, or the like. Particularly useful polysulfones are those derived from disulfonyl chlorides such as 4,4-biphenyldisulfonyl chloride reacted with 4,4'-dihydroxydiphenyl ether.

The polyarylethersulfones, including polyphenylene ether sulfones, contain at least the following recurring structural units

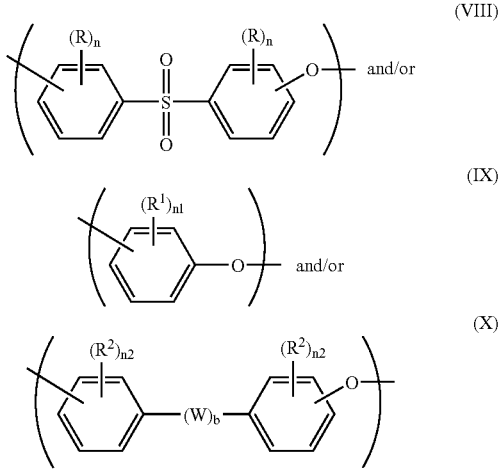

(VIII)

(IX)

(X)

wherein R, $R^1$ and $R^2$ are independently selected from $C_1$-$C_6$ alkyl, $C_4$-$C_8$ cycloalkyl, and halogen radicals; W is a $C_2$-$C_8$ alkylene, a $C_1$-$C_8$ alkylidene, a cycloalkylene or cycloalkylidene radical containing from 4 to about 16 ring carbon atoms, or the like; b is 0 or 1; and n, n1, and n2 are independently 0, 1, 2, 3, or 4. Additional description of polysulfone may be found, for example, in ASTM D6394, Standard Specification for Sulfone Plastics (SP).

Suitable poly(arylene ether)s include polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s are known polymers comprising a plurality of structural units of the formula

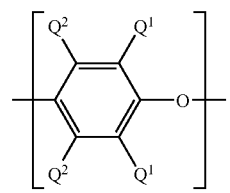

wherein for each structural unit, each $Q^1$ is independently halogen, primary or secondary $C_1$-$C_8$ alkyl, phenyl, $C_1$-$C_8$ haloalkyl, $C_1$-$C_8$ aminoalkyl, $C_1$-$C_8$ hydrocarbonoxy, or $C_2$-$C_8$ halohydrocarbonoxy wherein at least two carbon atoms separate the halogen and oxygen atoms; and each $Q^2$ is independently hydrogen, halogen, primary or secondary $C_1$-$C_8$ alkyl, phenyl, $C_1$-$C_8$ haloalkyl, $C_1$-$C_8$ aminoalkyl, $C_1$-$C_8$ hydrocarbonoxy, or $C_2$-$C_8$ halohydrocarbonoxy wherein at least two carbon atoms separate the halogen and oxygen atoms. Preferably, each $Q^1$ is alkyl or phenyl, especially $C_1$-$C_4$ alkyl, and each $Q^2$ is independently hydrogen or methyl.

Both homopolymer and copolymer poly(arylene ether)s are included. The preferred homopolymers are those comprising 2,6-dimethylphenylene ether units. Suitable copolymers include random copolymers comprising, for example, such units in combination with 2,3,6-trimethyl-1,4-phenylene ether units or copolymers derived from copolymerization of 2,6-dimethylphenol with 2,3,6-trimethylphenol. Such copolymers of 2,6-dimethylphenol and 2,3,6-trimethylphenol, especially those containing about 5 to about 50 weight percent of units derived from 2,3,6-trimethylphenol, are particularly preferred for their heat resistance. Also included are poly(arylene ether)s containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s of the present invention further include combinations of any of the above, including blends of poly(arylene ether)s and polystyrene resins.

The poly(arylene ether) generally has a number average molecular weight of about 3,000 to about 40,000 atomic mass units (AMU) and a weight average molecular weight of about 20,000 to about 80,000 AMU, as determined by gel permeation chromatography. The poly(arylene ether) generally may have an intrinsic viscosity of about 0.2 to about 0.6 deciliters per gram (dL/g) as measured in chloroform at 25° C. Within this range, the intrinsic viscosity may preferably be up to about 0.5 dL/g, more preferably up to about 0.47 dL/g. Also within this range, the intrinsic viscosity may preferably be at least about 0.3 dL/g. It is also possible to utilize a high intrinsic viscosity poly(arylene ether) and a low intrinsic viscosity poly(arylene ether) in combination. Determining an exact ratio, when two intrinsic viscosities are used, will depend on the exact intrinsic viscosities of the poly(arylene ether)s used and the ultimate physical properties desired.

The poly(arylene ether)s are typically prepared by the oxidative coupling of at least one monohydroxyaromatic compound such as 2,6-xylenol or 2,3,6-trimethylphenol. Catalyst systems are generally employed for such coupling. They typically contain at least one heavy metal compound such as a copper, manganese or cobalt compound, usually in combination with various other materials. Suitable methods for preparing poly(arylene ether)s are described, for example, in U.S. Pat. Nos. 3,306,874 and 3,306,875 to Hay, and U.S. Pat. Nos. 4,011,200 and 4,038,343 to Yonemitsu et al.

Suitable polycarbonates may be prepared by reacting a dihydric phenol with a carbonate precursor, such as phosgene, a haloformate, or a carbonate ester. Generally, such carbonate polymers possess recurring structural units of the formula

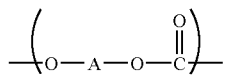

wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) of about 0.30 to about 1.00 dL/g. The dihydric phenols employed to provide such aromatic carbonate polymers may be mononuclear or polynuclear aromatic compounds, containing as functional groups two hydroxy radicals, each of which is attached directly to a carbon atom of an aromatic nucleus. Typical dihydric phenols include, for example, 2,2-bis(4-hydroxyphenyl)propane (bisphenol A); hydroquinone; resorcinol; 2,2-bis(4-hydroxyphenyl)pentane; 2,4'-(dihydroxydiphenyl)methane; bis(2-hydroxyphenyl)methane; bis(4-hydroxyphenyl)methane; bis(4-hydroxy-5-nitrophenyl)methane; 1,1-bis(4-hydroxyphenyl)ethane; 3,3-bis(4-hydroxyphenyl)pentane; 2,2-dihydroxydiphenyl; 2,6-dihydroxynaphthalene; bis(4-hydroxyphenyl)sulfone; bis(3,5-diethyl-4-hydroxyphenyl)sulfone; 2,2-bis(3,5-dimethyl-4-hydroxyphenyl)propane; 2,4'-dihydroxydiphenyl sulfone; 5'-chloro-2,4'-dihydroxydiphenyl sulfone; bis(4-hydroxyphenyl)diphenyl sulfone; 4,4'-dihydroxydiphenyl ether; 4,4'-dihydroxy-3,3'-dichlorodiphenyl ether; 4,4-dihydroxy-2,5-dihydroxydiphenyl ether; and the like.

Other dihydric phenols suitable for use in the preparation of polycarbonate resins are described, for example, in U.S. Pat. No. 2,999,835 to Goldberg, U.S. Pat. No. 3,334,154 to Kim, and U.S. Pat. No. 4,131,575 to Adelmann et al.

These aromatic polycarbonates can be manufactured by known processes, such as, for example and as mentioned above, by reacting a dihydric phenol with a carbonate precursor, such as phosgene, in accordance with methods set forth in the above-cited literature and in U.S. Pat. No. 4,123,436 to Holub et al., or by transesterification processes such as are disclosed in U.S. Pat. No. 3,153,008 to Fox, as well as other processes known to those skilled in the art.

It is also possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer is desired. Branched polycarbonates are also useful, such as are described in U.S. Pat. No. 4,001,184 to Scott. Also, there can be utilized blends of linear polycarbonate and a branched polycarbonate. Moreover, blends of any of the above materials may be employed in the practice of this invention to provide the aromatic polycarbonate.

These polycarbonates may be branched or linear and generally will have a weight average molecular weight of about 10,000 to about 200,000 AMU, preferably from about 20,000 to about 100,000 as measured by gel permeation chromatography. The polycarbonates of the invention can employ a variety of end groups to improve performance. Bulky mono phenols, such as cumyl phenol, are preferred.

Suitable polycarbonates further include those derived from bisphenols containing alkyl cyclohexane units. Such polycarbonates have structural units corresponding to the structure

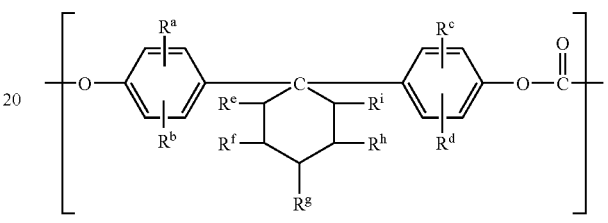

wherein $R^a$-$R^d$ are each independently hydrogen, $C_1$-$C_{12}$ hydrocarbyl, or halogen; and $R^e$-$R^i$ are each independently hydrogen, $C_1$-$C_{12}$ hydrocarbyl. As used herein, "hydrocarbyl" refers to a residue that contains only carbon and hydrogen. The residue may be aliphatic or aromatic, straight-chain, cyclic, bicyclic, branched, saturated, or unsaturated. The hydrocarbyl residue, when so stated however, may contain heteroatoms over and above the carbon and hydrogen members of the substituent residue. Thus, when specifically noted as containing such heteroatoms, the hydrocarbyl residue may also contain carbonyl groups, amino groups, hydroxyl groups, or the like, or it may contain heteroatoms within the backbone of the hydrocarbyl residue. Alkyl cyclohexane containing bisphenols, for example the reaction product of two moles of a phenol with one mole of a hydrogenated isophorone, are useful for making polycarbonate resins with high glass transition temperatures and high heat distortion temperatures. Such isophorone bisphenol-containing polycarbonates have structural units corresponding to the structure

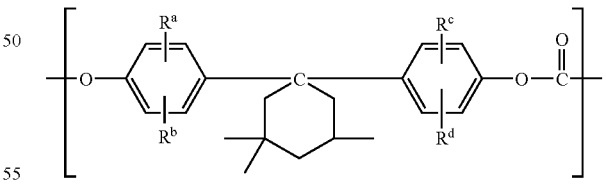

wherein $R^a$-$R^d$ are as defined above. These isophorone bisphenol based resins, including polycarbonate copolymers made containing non-alkyl cyclohexane bisphenols and blends of alkyl cyclohexyl bisphenol containing polycarbonates with non-alkyl cyclohexyl bisphenol polycarbonates, are supplied by Bayer Co. under the APEC trade name and described, for example, in U.S. Pat. No. 5,034,458 to Serini et al.

Suitable thermoplastic resins further include "polyarylates," which is the common term referring to polyesters of aromatic dicarboxylic acids and bisphenols. Polyarylate copolymers including carbonate linkages in addition to the aryl ester linkages, known as polyester-carbonates, are also suitable. These resins may be used alone or in combination with each other or more preferably in combination with bisphenol polycarbonates. These resins can be prepared in solution or by melt polymerization from aromatic dicarboxylic acids or their ester forming derivatives and bisphenols and their derivatives. Suitable dicarboxylic acids are iso- and terephthalic acid, their esters or acid chlorides. A preferred bisphenol is bisphenol A or its diacetate derivative. Polyester carbonates and polyarylates may also contain linkages derived from hydroxy carboxylic acids such as hydroxy benzoic acid. The most preferred polyester-carbonates and polyarylates are amorphous resins derived from bisphenol A and mixtures of isophthalic and terephthalic acid. Suitable polyarylates and their preparation are described, for example, in U.S. Pat. No. 4,663,421 to Mark. Suitable polyester-carbonates and their preparation are described, for example, in U.S. Pat. No. 3,169,121 to Goldberg, and U.S. Pat. No. 4,156,069 to Prevorsek et al.

In one embodiment, the substrate comprises at least about 50% by weight, preferably at least about 80% by weight, more preferably at least about 90% by weight, still more preferably at least about 95% by weight, of the thermoplastic resin.

In one embodiment the substrate comprises, in addition to the thermoplastic resin, an inorganic filler such as, for example, talc, mica, clay, titanium dioxide, zinc oxide, zinc sulfide, wollastonite, or the like, or a mixture thereof.

In another embodiment, the substrate is substantially free of inorganic filler. "Substantially free of inorganic filler" is defined herein as comprising less than 0.1 weight percent of inorganic filler. It may be preferred that the substrate comprises less than 0.01 weight percent of inorganic filler.

The substrate resin may further contain additives to improve melt processing, molding or part stability. Useful additives include lubricants and mold release agents, such as aliphatic esters, for example pentaerythritol tetrastearate, or polyolefins, for example high density polyethylene. Stabilizers, such as aryl phosphite and hindered phenols may also be blended with the substrate resin. Other additives include compounds to reduce static charge build up. If employed in the substrate, it is important to select such additives so that they are thermally stable, show low volatility and do not contribute to hazing in the metallized article.

The dimensions of the substrate will be dictated by the use of the reflective article. For example, when the reflective article is a headlight reflector, it may have a thickness of about 0.1 to about 20 millimeters in the dimension perpendicular to the haze-prevention layer and the reflective metal layer; within this range, the thickness may preferably be at least about 0.5 millimeters, more preferably at least about 1 millimeter; also within this range, the thickness may preferably be up to about 10 millimeters, more preferably up to about 8 millimeters. As another example, when the reflective article is a data storage disc, it may have a thickness of about 0.1 to about 5 millimeters in the dimension perpendicular to the haze-prevention layer and the reflective metal layer; within this range, the thickness may preferably be at least about 0.5 millimeters, more preferably at least about 1 millimeter; also within this range, the thickness may preferably be up to about 4 millimeters, more preferably up to about 3 millimeters.

The reflective article comprises a reflective metal layer. Metals suitable for use in the reflective metal layer include the metals of Groups IIIA, IIIB, IVB, VB, VIB, VIIB, VIII, IB, and IIB of the periodic table. Mixtures and alloys of these metals may also be used. Preferred metals include aluminum, silver, gold, nickel, palladium, platinum, copper, and the like, and alloys comprising at least one of the foregoing metals. Aluminum and its alloys are particularly preferred metals for the reflective metal layer.

The reflective metal layer may be formed using methods known in the art, including sputtering, vacuum metal deposition, vapor arc deposition, plasma chemical vapor deposition, thermal vapor metal deposition, and ion plating.

The reflective metal layer may have a thickness of about 1 to about 1000 nanometers. Within this range, the thickness may preferably be at least about 10 nanometers, more preferably at least about 20 nanometers. Also within this range, the thickness may preferably be up to about 500 nanometers, more preferably up to about 200 nanometers.

The reflective article comprises a haze-prevention layer interposed between the substrate and the reflective metal layer. The haze-prevention layer comprises comprising a material having a volume resistivity of at least $1 \times 10^{-4}$ ohm-centimeters measured according to ASTM D257 at 25° C. and a tensile modulus of at least about $3 \times 10^5$ pounds per square inch (2068 megapascals) measured according to ASTM D638 at 25° C. The volume resistivity may preferably be at least $1 \times 10^{-2}$ ohm-centimeters, more preferably at least 1 ohm-centimeter. The tensile modulus may preferably be at least about $5 \times 10^5$ pounds per square inch (3447 megapascals), more preferably at least about $8 \times 10^5$ pounds per square inch (5516 megapascals), still more preferably at least about $1 \times 10^6$ pounds per square inch (6895 megapascals). In a preferred embodiment, the haze prevention layer has a tensile modulus of at least $3 \times 10^5$ pounds per square inch (2068 megapascals) measured at the heat distortion temperature of the amorphous resin employed in the substrate. In this embodiment, if the substrate includes more than one amorphous resin, the tensile modulus is measured at the lowest heat distortion temperature of any amorphous resin. The haze-prevention layer is preferably non-metallic, and plasma-polymerized haze-prevention layers are highly preferred. In addition to meeting the above resistivity limitation, the non-metallic haze-prevention layer may preferably comprise less than 1 weight percent total of zero-valent metals.

In one embodiment, the haze-prevention layer comprises a plasma-polymerized organosilicone. A plasma-polymerized organosilicone, sometimes called a hydroxy silicon carbide or silicon oxy carbon coating, is a product of plasma deposition of a silicone precursor having the formula

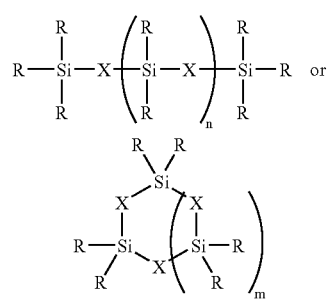

wherein each R is independently hydrogen, $C_1$-$C_6$ alkyl, $C_2$-$C_6$ alkenyl, $C_3$-$C_6$ alkenyl alkyl, $C_6$-$C_{18}$ aryl, or the like; n is 0 to about 100; m is 1 to about 100; and X is —O— or —NH—.

Preferred organosilicone compounds include

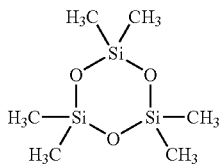

(hexamethyl(cyclotrisiloxane) or "D₃"),

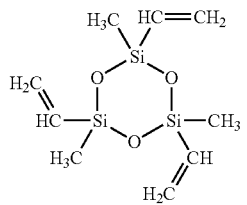

(cyclotri(methylvinylsiloxane) or "Vinyl D₃"),

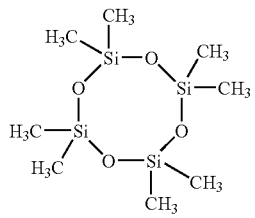

(octamethyl(cyclotetrasiloxane) or "D4")

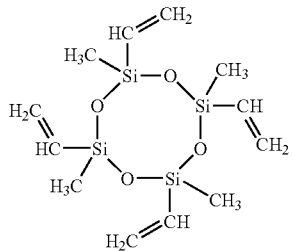

(cyclotetra(methylvinylsiloxane or "Vinyl D₄"),

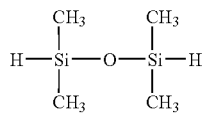

(tetramethyldisiloxane),

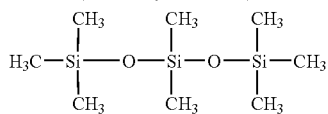

(octamethyltrisiloxane),

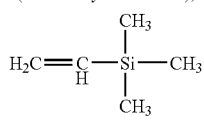

(vinyltrimethylsilane),

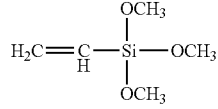

(vinyltrimethoxysilane),

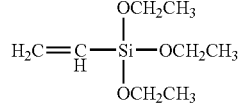

(vinyltriethoxysilane),

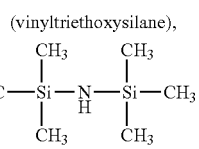

(hexamethyldisilazane, sometimes referred to as "HDMS"), and

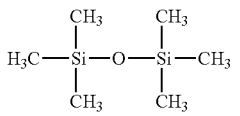

(hexamethyldisiloxane), and the like, and mixtures thereof.

Plasma polymerization of the organosilicone may take place in the presence of a small amount of oxygen that may be incorporated into the coating. The plasma-polymerized organosilicone haze-reduction layer can be formed from a variety of plasma deposition techniques including plasma assisted or enhanced chemical vapor deposition (PECVD, PACVD) using plasma sources of radio frequency (RF), microwave (MW), inductively coupled plasma (ICP), electron cyclotron resonance (ECR), hollow cathode, thermal plasma, expanding thermal plasma (ETP), and plasma arcs or jets. In a preferred embodiment, the haze reduction layer is deposited by ETP as described in patents U.S. Pat. No. 6,420,032 to Iacovangelo and U.S. Pat. No. 6,397,776 to Yang et al.

In one embodiment, the haze-prevention layer comprises at least about 50 weight percent, preferably at least about 80 weight percent, more preferably at least about 90 weight percent, still more preferably at least about 95 weight percent of the plasma-polymerized organosilicone, based on the total weight of the haze-prevention layer.

In another embodiment, the haze-prevention layer comprises diamond-like carbon. A haze-prevention layer comprising diamond-like carbon may be formed from plasma-assisted chemical vapor deposition of organic monomer as described, for example, in U.S. Pat. No. 5,506,038 to Knapp et al., and U.S. Pat. Nos. 5,527,596 and 5,508,092 to Kimock et al.

In another embodiment, the haze-prevention layer comprises a colloidal silica composition comprising colloidal silica dispersed in a silanol-, acrylic-, or methacrylic-derived polymer system. For example, the colloidal silica composition may be an acidic dispersion of colloidal silica and hydroxylated silsesquioxane in an alcohol-water medium. More particularly, the coating composition may be a dispersion of colloidal silica in a lower aliphatic alcohol-water solution of a silanol having the formula $RSi(OH)_3$ in which R may be, for example, $C_1$-$C_3$ alkyl, vinyl, 3,3,3-trifluoropropyl, gamma-glycidoxypropyl, gamma-methacryloxypropyl, or the like. Preferably, at least 70 percent of the silanol is $CH_3Si(OH)_3$. The composition may comprise, for example, 10 to 50 weight percent solids consisting essentially of 10 to 70 weight percent colloidal silica and 30 to 90 weight percent of a partial condensate of the silanol (i.e., a hydroxylated silsesquioxane), the composition containing sufficient acid to provide a pH in the range of 3.0 to 6.0.

Suitable coating compositions and their preparation are described, for example, in U.S. Pat. No. 3,986,997 to Clark and U.S. Pat. No. 5,346,767 to Tilley et al.

As another example, the colloidal silica composition may be a silica containing coating composition comprising about 10 to 50 weight percent solids dispersed in a water/aliphatic alcohol mixture wherein the solids comprise about 10 to 70 weight percent ammonium hydroxide-stabilized colloidal silica and about 30 to 90 weight percent of a partial condensate derived from an organotrialkoxy silane of the formula R'Si(OR)$_3$ wherein R' may be, for example, $C_1$-$C_3$ alkyl, $C_6$-$C_{13}$ aryl, or the like, and R may be, for example, $C_1$-$C_8$ alkyl, $C_6$-$C_{20}$ aryl, or the like, the composition having a pH of from about 7.1 to about 7.8. Suitable coating compositions and their preparation are described, for example, in U.S. Pat. No. 4,624,870 to Blair and U.S. Pat. No. 5,346,767 to Tilley et al.

As a third example, the colloidal silica composition may be an ultraviolet light curable coating comprising about 1 to about 60 weight percent colloidal silica; about 1 to about 50 weight percent of the material produced by the hydrolysis of silyl acrylate; and about 25 to about 90 weight percent of an acrylate monomer. The composition may, optionally, further include about 0.1 to about 5 weight percent of a UV photoinitiator. Preferred compositions are derived from aqueous colloidal silica, 2-methacryloxy-propyltrimethoxysilane, hexanediolacrylate, and a photosensitizing amount of a photoinitiator. Suitable compositions and their preparation are described, for example, in U.S. Pat. No. 4,491,508 to Olson et al. and U.S. Pat. No. 5,346,767 to Tilley et al.

As a fourth example, the colloidal silica composition may be an ultraviolet light curable coating comprising 100 parts by weight of colloidal silica; 5-500 parts by weight of an acryloxy-functional silane or glycidoxy-functional silane; 10-500 parts by weight of a non-silyl acrylate; and a catalytic amount of an ultraviolet light sensitive photoinitiator. Preferred compositions comprise aqueous colloidal silica, methacryloxypropyl trimethoxysilane, hexanedioldiacrylate, a glycidyloxy functional silane, and a cationic photoinitiator. These compositions and their preparation are disclosed in U.S. Pat. No. 4,348,462 to Chung, U.S. Pat. No. 4,491,508 to Olson, and U.S. Pat. No. 5,346,767 to Tilley et al.

In one embodiment, the haze-prevention layer comprises at least about 50 weight percent, preferably at least about 80 weight percent, more preferably at least about 90 weight percent, still more preferably at least about 95 weight percent of the colloidal silica composition, based on the total weight of the haze-prevention layer.

In one embodiment, the haze-prevention layer comprises a thermoset resin. Suitable thermoset resins include thermoset polyester resins, thermoset epoxy resins, novolac resins, melamine resins, and the like. Such resins are well known in the art and commercially available.

In one embodiment, the haze-prevention comprises at least about 50 weight percent, preferably at least about 80 weight percent, more preferably at least about 90 weight percent, still more preferably at least about 95 weight percent of the thermoset resin, based on the total weight of the haze-prevention layer.

The thickness of the haze-prevention layer will depend on its composition, but it is generally about 10 nanometers to about 100 micrometers. Within this range, the thickness may preferably be at least about 20 nanometers, more preferably at least about 40 nanometers. Also within this range, the thickness may preferably be up to about 50 micrometers, more preferably up to about 10 micrometers. Depending on the material employed in the haze-prevention layer, it may be possible to use thinner haze-prevention layers. For example, when the haze-prevention layer comprises a plasma-polymerized organosilicone, the thickness may be less than 100 nanometers, preferably less than 90 nanometers, more preferably less than 80 nanometers, still more preferably less than 70 nanometers.

Although the substrate is well suited for direct application of a haze-prevention layer, it is also possible to pre-coat the substrate with a primer before applying the haze-prevention layer. It may also be advantageous to further coat the reflective article with a clear, hard protective layer to protect the reflective metal layer from scratching, oxidation, or related problems. The protective layer may, preferably, exhibit a percent transmittance greater than 90 percent measured nanometers according to ASTM D1003. The protective layer may, preferably, exhibit a yellowness index less than 5 measured according to ASTM D1925. Suitable compositions and methods for preparing protective metal oxide layers are described, for example, in U.S. Pat. No. 6,110,544 to Yang et al., and U.S. Pat. No. 6,379,757 B1 to Iacovangelo. Thus, in one embodiment, the reflective article includes a substrate, a haze-prevention layer, a reflective layer, and a protective layer, wherein the haze-prevention layer is interposed between substrate and the reflective layer, and the reflective layer is interposed between the haze-prevention layer and the protective layer.

In a preferred embodiment, the reflective article comprises a surface having a reflectivity of at least 80%, more preferably at least about 85%, even more preferably at least about 90%, measured according to ASTM D523. In a highly preferred embodiment, the reflective article comprises a surface having a reflectivity of at least 80%, more preferably at least about 85%, even more preferably at least about 90%, after 15 minutes exposure to the lowest heat distortion temperature of any thermoplastic resin in the substrate.

FIG. 1 presents an exploded perspective view of a section of a reflective article 10. Haze-prevention layer 40 is interposed between substrate 20 and reflective metal layer 30.

The reflective article may be used, for example, as an automotive headlight reflector, a reflector incorporated into a projector lamp, a mirror of any shape and curvature. Headlight reflectors and their preparation is described, for example, in U.S. Pat. No. 4,210,841 to Vodicka et al., U.S. Pat. No. 5,503,934 to Maas et al., and U.S. Pat. No. 6,355,723 B1 to van Baal et al. Data storage media and methods for their preparation are described, for example, in U.S. Pat. No. 5,783,653 to Okamoto et al., and U.S. Pat. No. 6,436,503 to Cradic et al., as well as U.S. patent application Publication Nos. 2002-0048691 A1 to Davis et al., 2002-0094455 A1 to Feist et al., 2002-0197438 A1 to Hay et al., and 2003-0044564 A1 to Dris et al.

In an embodiment preferred for its simplicity, the reflective article consists essentially of: a substrate comprising an amorphous thermoplastic resin having a heat distortion temperature of at least about 140° C. measured at 66 psi according to ASTM D648, a density less than 1.7 grams per milliliter, and an organic volatiles content less than 1,000 parts per million measured according to ASTM D4526; a reflective metal layer; and a haze-prevention layer interposed between the substrate and the reflective metal layer, wherein the haze-prevention layer comprises a material having a volume resistivity of at least $1 \times 10^{-4}$ ohm-centimeters measured according to ASTM D257 at 25° C. and a tensile modulus of at least about $3 \times 10^5$ pounds per square inch measured according to ASTM D638 at 25° C.

In a preferred embodiment, the reflective article is a data storage medium that comprises: a substrate comprising a polysulfone or an isophorone bisphenol-containing polycarbonate resin having a glass transition temperature of at least about 170° C., a density less than 1.7 grams per milliliter, and an organic volatiles content less than 1,000 parts per million measured according to ASTM D4526; a reflective metal layer comprising aluminum; and a plasma-polymerized organosilicone haze-prevention layer interposed between the substrate and the reflective metal layer, wherein the haze-prevention layer comprises a plasma-polymerized organosilicone having a volume resistivity of at least $1\times10^{-2}$ ohm-centimeters measured according to ASTM D257 at 25° C. and a tensile modulus of at least about $5\times10^5$ pounds per square inch measured according to ASTM D638.

Another embodiment is a method for preparing a data storage medium, comprising: applying a haze-prevention layer to a surface of a substrate, wherein the haze-prevention layer comprises a material having a volume resistivity of at least $1\times10^{-4}$ ohm-centimeters measured according to ASTM D257 at 25° C. and a tensile modulus of at least about $3\times10^5$ pounds per square inch measured according to ASTM D638, and wherein the substrate comprises an amorphous thermoplastic resin having a heat distortion temperature of at least about 140° C. measured according to ASTM D648, a density less than 1.7 grams per milliliter, and an organic volatiles content less than 1,000 parts per million measured according to ASTM D4526; and applying a reflective metal layer to a surface of the haze-prevention layer.

The invention is further illustrated by the following non-limiting examples. Examples of the invention are designated by numbers. Comparative examples are designated by letters.

COMPARATIVE EXAMPLE A, EXAMPLES 1-3

Injection molded 102 millimeter diameter×3.2 millimeter thick discs of polyetherimide (ULTEM 1010 from GE Plastics Co.) were coated using the following process: samples were pumped down in a vacuum chamber and glow cleaned at a power setting of 3.0 kW for 180 seconds at 0.023 torr. The parts were the pre-coated with a haze-reducing plasma-polymerized organosilicone coating made by introducing hexamethyldisiloxane (HMDSO) into the chamber and creating a plasma. The pressure was 0.027 to 0.036 torr, and the power was 3.2 kilowatts (kW). The plasma-polymerized organosilicone coating time was varied from 2 to 4 to 8 minutes to give a plasma-polymerized organosilicone coating thickness of about 40 to about 145 nm. The parts were then coated with about 100 nm of aluminum at 0.00005 torr. A post metallization protective top-coat was then applied at 0.027 torr, power 3.2 kW for 180 seconds. Coated samples were then subject to a post glow for 180 seconds at 3.2 kW at 0.018 torr and were taken from the chamber.

In order to test the haze-prevention performance of the samples coated with plasma-polymerized organosilicone, the parts were heated from 198 to 210° C. in 2° C. increments and observed for haze. Results are shown in Table 1. Comparative Example A, the metallized polyetherimide (PEI) control with no plasma-polymerized organosilicone haze-prevention layer, showed haze at 204° C. Example 1, with a two minute plasma-polymerized organosilicone haze-prevention layer, resisted haze formation until 208° C. Example 2, with a 4 minute plasma-polymerized organosilicone haze-prevention layer, resisted haze up to 210° C. Example 3, with an eight minute plasma-polymerized organosilicone haze-prevention layer, showed a haze resistance up to 210° C.

TABLE 1

| | Haze Onset ° C. | Plasma-Polymerized Organosilicone Coating Thickness |
|---|---|---|
| Example A PEI-No plasma-polymerized organosilicone under-coat | 204 | None |
| Example 1 PEI-2 minute plasma-polymerized organosilicone under-coat | 208 | 41 nm |
| Example 2 PEI-4 minute plasma-polymerized organosilicone under-coat | 210 | 64 nm |
| Example 3 PEI-8 minute plasma-polymerized organosilicone under-coat | 210 | 145 nm |

COMPARATIVE EXAMPLES B-I, EXAMPLES 4-11

Disks, 102 millimeter×3.2 millimeter, of various high glass transition temperature ($T_g$) thermoplastics resins (Table 2) were injection molded and metallized as described above. Control examples (B-I) were coated with a reflective aluminum coating of about 100 nm that was then protected with a top-coat layer. Examples of the invention (4-11) were first coated for about four minutes with a haze reducing hydroxy silicon carbide layer generated from the plasma deposition of HMDSO. The hydroxy silicon carbide layer thickness was about 64 nm. The samples were then coated with a reflective layer of aluminum and top-coated with a protective layer.

Table 2 shows the high Tg resins tested. Heat distortion temperature (HDT) was measured according to ASTM D648. Glass transition temperature was measured by differential scanning calorimetry (DSC) according to ASTM D3418.

TABLE 2

| Thermoplastic Resin | $T_g$ (° C.) | HDT @ 66 psi (° C.) |
|---|---|---|
| Polyethersulfone, ULTRASON E2010 from BASF Co. | 220 | 208 |
| Bisphenol A Polysulfone, UDEL P-1700 from Solvay Co. | 185 | 178 |
| Bisphenol A Polycarbonate, LEXAN 141 from GE Plastics Co. | 148 | 140 |
| Isophorone bisphenol based polycarbonate, APEC 9359 from Bayer Co. | 184 | 174 |
| Isophorone bisphenol based polycarbonate, APEC 9379 from Bayer Co. | 206 | 190 |
| 75:25 blend of Polyetherimide and Polycarbonate ester, ULTEM ATX200 from GE Plastics | 215 & 175 | 197 |
| Polyetherimide with mold release, ULTEM 1010M from GE Plastics Co. | 217 | 207 |
| Polyetherimide Sulfone, ULTEM XH6050 from GE Plastics Co. | 249 | 237 |

The coated samples were then heated in an air-circulating oven to examine haze formation. The initial temperature was about 20° C. below the glass transition temperature of each different resin. The temperature was raised in 2° C. increments until hazing was observed. Samples were held for about 90 minutes at each temperature. For each type of resin the control sample and the haze reduced samples were heated under the same conditions. Heating temperatures were varied to reflect the heat capability ($T_g$ and HDT) of each individual resin or resin mixture.

Table 3 shows the temperature at which haze formation is first observed for control samples B-I, in which substrates were coated with just a reflective aluminum layer, and samples of the invention, 4-11, including a substrate, a plasma-polymerized organosilicone haze-prevention layer, and a reflective metal layer. Note that for each resin the plasma-polymerized organosilicone underlayer (haze-prevention layer) imparts an increased resistance to hazing; the onset of hazing is seen at a higher temperature.

TABLE 3

| Thermoplastic Resin | Control Example | Only reflective layer Onset Haze (° C.) | Invention Example | Reflective layer with plasma-polymerized organosilicone underlayer Onset Haze (° C.) |
|---|---|---|---|---|
| Polyethersulfone | B | 206 | 4 | 216 |
| Bisphenol A Polysulfone | C | 178 | 5 | 182 |
| Bisphenol A Polycarbonate | D | 139 | 6 | 143 |
| Isophorone bisphenol based polycarbonate, APEC 9359 | E | 173 | 7 | 178 |
| Isophorone bisphenol based polycarbonate, APEC 9379 | F | 184 | 8 | 194 |
| 75:25 blend of Polyetherimide and Polyester carbonate | G | 196 | 9 | 198 |
| Polyetherimide with mold release | H | 204 | 10 | 210 |
| Polyetherimide Sulfone | I | 221 | 11 | 225 |

COMPARATIVE EXAMPLES J AND K

Two polycarbonate plaques (LEXAN® 140, obtained from General Electric Company) having thicknesses of 1.52 and 6.35 millimeters were metallized with aluminum by DC magnetron sputtering at 70 watts and 8 millitorr for 20 minutes to produce a reflective layer thickness of about 100-200 nanometers. The metallized samples were placed in an air-circulating oven for various lengths of time at increasing temperatures. At an oven temperature of 125° C., samples did not haze after 48 hours, but at 138° C., samples became hazy after about 10 to 20 minutes. Haze was observed visually. Selected samples were also examined by optical microscopy.

EXAMPLES 12 AND 13

The procedure of Comparative Examples J and K was followed, except that the polycarbonate plaques were pre-coated with an acrylic-modified colloidal silica composition before metalization. The acrylic-modified colloidal silica composition was obtained as an AS4000 suspension from GE Silicones and applied by flow coating and thermal curing to produce a cured haze reducing layer coating thickness of about 6-8 micrometers. After metallization with aluminum, samples showed no evidence of haze after up to 24 hours at temperatures as high as 145° C. Although there was no hazing at 145° C., samples warped and the acrylic-modified colloidal silica cracked at that temperature. This system, though successful at reducing haze, was not optimized for other performance features.

COMPARATIVE EXAMPLE L

Plaques of polyetherimide (ULTEM 1000) having thicknesses of 3.2 millimeters were metallized according with aluminum according to the procedure of Comparative Examples J and K to create a reflective layer thickness of about 200 nanometers. Samples were tested at oven temperatures of 195 to 210° C. The samples developed haze after times varying from 48 hours (at 195° C.) to 3 minutes (at 210° C.).

EXAMPLE 14

A 3.2 millimeter thick plaque of polyetherimide (ULTEM® 1000) was coated with a plasma-polymerized organosilicone layer to yield a coating thickness of about 2 micrometers. The plasma deposition was carried out using an expanding argon thermal plasma at 70 amps with 1.65 standard liters per minute (slpm) of argon. Deposition was carried out in two coating passes each about 1 micrometer thick. Oxygen and octamethylcyclotetrasiloxane (D4) were fed downstream of the expanding plasma through a ring injector. The feed rate of D4 was 0.19 slpm in both passes, and the feed rate of oxygen was 0.3 and 0.8 slpm in the first and second passes, respectively. The sample was then metallized by sputtering aluminum onto the plasma-polymerized organosilicone surface to yield a reflective layer thickness of about 200 nanometers. The sample was oven tested as described above. No hazing was observed at temperatures up to 220° C.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

The invention claimed is:

1. A data storage medium, comprising:
    a substrate comprising an amorphous thermoplastic resin having
        a heat distortion temperature of at least about 140° C. measured at 66 pounds per square inch according to ASTM D648.
        a density less than 1.7 grams per milliliter, and
        an orannic volatiles content less than 1,000 parts per million measured according to ASTM D4526;
    a reflective metal layer;
    a haze-prevention layer interposed between the substrate and the reflective metal layer, wherein the haze-prevention layer comprises a material having a volume resistivity of at least $1 \times 10^{-4}$ ohm-centimeters according to ASTM D257 at 25° C. and a tensile modulus of at least about $3 \times 10^5$ pounds per square inch measured according to ASTM D638 at 25° C.; wherein the haze-prevention layer has a thickness of 145 nanometers to about 100 micrometers; wherein the haze-prevention layer contacts the substrate and the reflective metal layer; and a protective metal oxide layer having a percent transmittance of at least 90% measured according to ASTM D1003 at 25° C.; wherein the reflective layer is interposed between the haze-prevention layer and the protective metal oxide layer; and wherein the reflective layer contacts the protective metal oxide layer;

wherein the haze-prevention layer comprises a plasma-polymerized organosilicone, wherein the organosilione has the formula

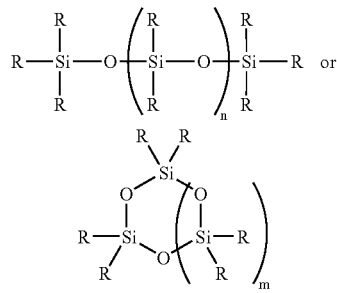

wherein each occurrence of R is independently $C_1$-$C_6$ alkyl, $C_2$-$C_6$ alkenyl, $C_3$-$C_6$ alkenyl alkyl, or $C_6$-$C_{18}$ aryl; n is 0 to 100; and m is 1 to 100; and wherein the data storage medium is adapted for reading via the substrate.

2. The data storage medium of claim 1, wherein the amorphous thermoplastic resin is selected from polyetherimides, polyetherimide sulfones, polysulfones, polyethersulfones, polyphenylene ether sulfones, poly(arylene ether)s, polycarbonates, polyester carbonates, polyarylates, and mixtures thereof.

3. The data storage medium of claim 1, wherein the amorphous thermoplastic resin comprises a polysulfone or an isophorone bisphenol-containing polycarbonate.

4. The data storage medium of claim 1, wherein the substrate is substantially free of inorganic filler.

5. The data storage medium of claim 1, wherein the substrate has a thickness of about 0.1 to about 20 millimeters in a dimension perpendicular to the haze-prevention layer and the reflective metal layer.

6. The data storage medium of claim 1, wherein the reflective metal layer comprises a metal selected from aluminum, silver, gold, nickel, palladium, platinum, copper, and alloys thereof.

7. The data storage medium of claim 1, wherein the reflective metal layer comprises aluminum.

8. The data storage medium of claim 1, wherein the reflective metal layer has a thickness of about 10 to about 1000 nanometers.

9. The data storage medium of claim 1, wherein the organosilicone is octamethyl(cyclotetrasiloxane), hexamethyl(cyclotrisiloxane), tetramethyldisiloxane, hexamethyldisiloxane, octamethyltrisiloxane, cyclotetra(methylvinylsiloxane), cyclotri(methylvinylsiloxane), or a mixture thereof.

10. The data storage medium of claim 1, comprising a surface with a reflectivity of at least 80% measured according to ASTM D523.

11. The data storage medium of claim 1, wherein the protective metal oxide layer comprises an oxide of titanium.

12. The data storage medium of claim 1, wherein the protective metal oxide layer comprises an oxide of zinc.

13. A data storage medium, comprising:

a substrate comprising a polysulfone or an isophorone bisphenol-containing polycarbonate resin having
a glass transition temperature of at least about 170° C.,
a density less than 1.7 grams per milliliter, and
an organic volatiles content less than 1,000 parts per million measured according to ASTM D4526;

a reflective metal layer comprising aluminum;

a haze-prevention layer interposed between the substrate and the reflective metal layer, wherein the haze-prevention layer comprises a plasma-polymerized organosilicone having a volume resistivity of at least $1 \times 10^{-2}$ ohm-centimeters measured according to ASTM D257 at 25° C. and a tensile modulus of at least about $5 \times 10^5$ pounds per square inch measured according to ASTM D638 at 25° C.; wherein the haze-prevention layer has a thickness of 145 nanometers to about 100 micrometers; wherein the haze-prevention layer contacts the substrate and the reflective metal layer; and a protective metal oxide layer having a percent transmittance of at least 90% measured according to ASTM D1003 at 25° C.; wherein the reflective layer is interposed between the haze-prevention layer and the protective metal oxide layer; and wherein the reflective layer contacts the protective metal oxide layer;

wherein the organosilicone has the formula

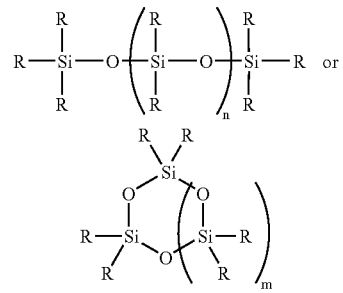

wherein each occurrence of R is independently $C_1$-$C_6$ alkyl, $C_2$-$C_6$ alkenyl, $C_3$-$C_6$ alkenyl alkyl, or $C_6$-$C_{18}$ aryl; n is 0 to 100; and m is 1 to 100; and wherein the data storage medium is adapted for reading via the substrate.

14. A method for preparing a data storage medium, comprising:

applying a haze-prevention layer to a surface of a substrate;
wherein the haze-prevention layer comprises a material having a volume resistivity of at least $1 \times 10^{-4}$ ohm-centimeters measured according to ASTM D257 at 25° C. and a tensile modulus of at least about $3 \times 10^5$ pounds per square inch measured according to ASTM D638 at 25° C.; wherein the haze-prevention layer has a thickness of 145 nanometers to about 100 micrometers;

wherein the haze-prevention layer comprises a plasma-pulymerized organosilicone. wherein the organosilicone has the formula

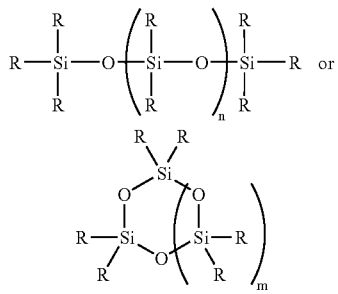

wherein each occurrence of R is independently $C_1$-$C_6$ alkyl, $C_2$-$C_6$ alkenyl, $C_3$-$C_6$ alkenyl alkyl, or $C_6$-$C_{18}$ aryl; n is 0 to 100; and m is 1 to 100; and wherein the substrate comprises an amorphous thermoplastic resin having a heat distortion temperature of at least about 140° C. measured at 66 pounds per square inch according to ASTM D648, a density less than 1.7 grams per milliliter, and an organic volatiles content less than 1,000 parts per million measured according to ASTM D4526;

applying a reflective metal layer to a surface of the haze-prevention layer; and applying a protective metal oxide layer to the reflective metal layer; wherein the protective metal oxide layer has a percent transmittance of at least 90% measured according to ASTM D1003;

wherein the data storage medium is adapted for reading via the substrate.

* * * * *